United States Patent [19]

Papworth et al.

[11] Patent Number: 5,452,426
[45] Date of Patent: Sep. 19, 1995

[54] COORDINATING SPECULATIVE AND COMMITTED STATE REGISTER SOURCE DATA AND IMMEDIATE SOURCE DATA IN A PROCESSOR

[75] Inventors: David B. Papworth, Beaverton; Glenn J. Hinton, Portland; Michael A. Fetterman, Hillsboro; Robert P. Colwell, Portland; Andrew F. Glew, Hillsboro, all of Oreg.

[73] Assignee: Intel Corporation, Santa Clara, Calif.

[21] Appl. No.: 177,240

[22] Filed: Jan. 4, 1994

[51] Int. Cl.$^6$ .......................... G06F 9/24; G06F 9/28; G06F 9/38
[52] U.S. Cl. ..................... 395/375; 395/775; 395/800; 364/262.4; 364/946.2; 364/931.52
[58] Field of Search .................. 395/375, 775, 800

[56] References Cited

U.S. PATENT DOCUMENTS

| | | | |
|---|---|---|---|
| 4,903,196 | 2/1990 | Pomerene et al. | 395/375 |
| 4,991,090 | 2/1991 | Emma et al. | 395/575 |
| 5,303,356 | 4/1994 | Vassiliadis et al. | 395/375 |

FOREIGN PATENT DOCUMENTS 0301220 1/1989 European Pat. Off. ........ G06F 9/38

OTHER PUBLICATIONS

G. Sohi, "Instruction Issue Logic for High-Performance, Interruptible, Multiple Functional Unit, Pipelined Computers", 1990 IEEE, pp. 349–359.

J. Smith, "Dynamic Instruction Scheduling and the Astronautics ZS-1", 1989 IEEE, pp. 21–34.

V. Popescu, et al., "The Metaflow Architecture", IEEE Micro, 1991, pp. 10–13, and 63–73.

Primary Examiner—David Y. Eng
Attorney, Agent, or Firm—Blakely, Sokoloff, Taylor & Zafman

[57] ABSTRACT

A mechanism for coordinating source data in a processor, wherein a decode circuit issues instructions comprising at least one immediate valid flag and at least one logical register source. The immediate valid flag indicates whether an immediate operand for the instruction is available on an immediate data bus, and the logical register source specifies a physical register or a committed state register. A speculative result data value and a speculative source valid flag are read from the physical register, and a committed result data value is read from the committed state register. The speculative result data value and the speculative source valid flag or the committed result data value and the committed source valid flag provide a source data value and a source data valid flag for scheduling an execution of the instruction.

44 Claims, 8 Drawing Sheets

COORDINATING SPECULATIVE AND COMMITTED STATE REGISTER SOURCE DATA AND IMMEDIATE SOURCE DATA IN A PROCESSOR

BACKGROUND OF THE INVENTION

1. Field of the Invention

The present invention pertains to the field of computer systems. More particularly, this invention relates to coordinating speculative and committed state register source data and immediate source data in an a processor performing speculative out-of-order instruction execution.

2. Background

Typical prior computer processors implement in-order instruction execution pipelines. An in-order processor usually fetches an instruction stream from a memory, and executes each instruction in the instruction stream according to a sequential program order. Such in-order instruction execution ensures that data dependencies among the instructions are strictly observed.

A processor may perform out-of-order instruction execution to increase instruction execution performance. Such a processor executes ready instructions in the instruction stream ahead of earlier instructions in the program order that are not ready. A ready instruction is typically an instruction having fully assembled source data and available execution resources. Typically, the source data or operands for an instruction comprises the contents of one or more internal processor registers, or immediate source data, or a combination thereof.

Such out-of-order execution improves processor performance because the instruction execution pipeline of the processor does not stall while awaiting source data or execution resources for a non ready instruction. For example, an instruction in the instruction stream may require source data from a processor register, wherein the processor register is loaded by a pending external memory fetch operation. Such an instruction awaiting the results of the external memory fetch does not stall the execution of later instructions in the instruction stream that are ready to execute.

A processor may also perform speculative instruction execution to increase instruction execution performance. Such a processor typically determines a speculative execution path through a program by predicting the result of branch instructions. Such a processor fetches an instruction stream from a memory, predicts a branch result for each branch instruction, and continues fetching and executing the instruction stream according to the predicted branch result. Such speculative execution increases processor performance because the instruction execution pipeline does not stall during the resolution of branch instructions.

A processor that performs both speculative and out-of-order instruction execution generates speculative result data in an out-of-order sequence in relation to the original program order. The result data is out-of-order because the instructions that cause generation of the result data are executed out-of-order. The result data is speculative until the branch prediction that caused speculative execution of the instructions is resolved.

Such a speculative out-of-order processor requires a mechanism for coordinating the source data required for execution of each instruction in the instruction stream. The required source data for an instruction may be immediate source data which is available with the instruction. The required source data for an instruction may be result data generated by execution of other instructions. Such result data may be assigned to a speculative state resource or a committed state resource. The speculative result data in the speculative state resource is not valid until the instructions generating the source data have completed execution. The speculative state result data becomes committed state result data after program exceptions and branch predictions are resolved.

SUMMARY AND OBJECTS OF THE INVENTION

One object of the present invention is to coordinate instruction source data from the speculative and committed state resources in a processor performing speculative out-of-order instruction execution.

Another object of the present invention is to coordinate instruction source data for an instruction wherein the possible sources for data include speculative source data values, committed state source data values, immediate data values, and source data values not yet available from execution of previous instructions.

Another object of the present invention is to coordinate instruction source data from the speculative and committed state resources with immediate source data.

Another object of the present invention is to provide valid flags for the speculative and committed state resources and combine the valid flags to indicate the availability of source data for instruction dispatch.

A further object of the present invention is to generate a source data valid flag for each instruction source such that the source data valid flag indicates whether the source data from the speculative or committed state resource or immediate operand is available for instruction dispatch.

Another object of the present invention is to coordinate a result data valid flag for each speculative state register in the processor such that the result data flag indicates whether the result data from instruction execution is available as source data for other instructions.

These and other objects of the invention are provided by a mechanism for coordinating source data in a processor, wherein a decode circuit issues at least one instruction over a logical instruction bus. Each instruction includes at least one immediate valid flag and at least one logical register source. The immediate valid flag indicates whether the decode circuit transfers an immediate operand for the instruction over an immediate data bus. The logical register source specifies a physical register or a committed state register containing source data for the instruction.

A speculative result data value and a speculative source valid flag are read from the physical register, and transferred over a register source data bus if the logical register source specifies the physical register. The speculative valid flag indicates whether the speculative source data value is valid.

A committed result data value is read from the committed state register, and the committed result data value and a committed source valid flag are transferred over the register source data bus if logical register source specifies the committed state register. The committed source valid flag indicates that the committed result data value is valid.

The speculative result data value and the speculative source valid flag or the committed result data value and the committed source valid flag or the immediate operand from the immediate data bus is coupled to a dispatch source data bus according to the immediate valid flag. The dispatch source data bus provides a source data value and a source data valid flag for scheduling an execution of the instruction.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
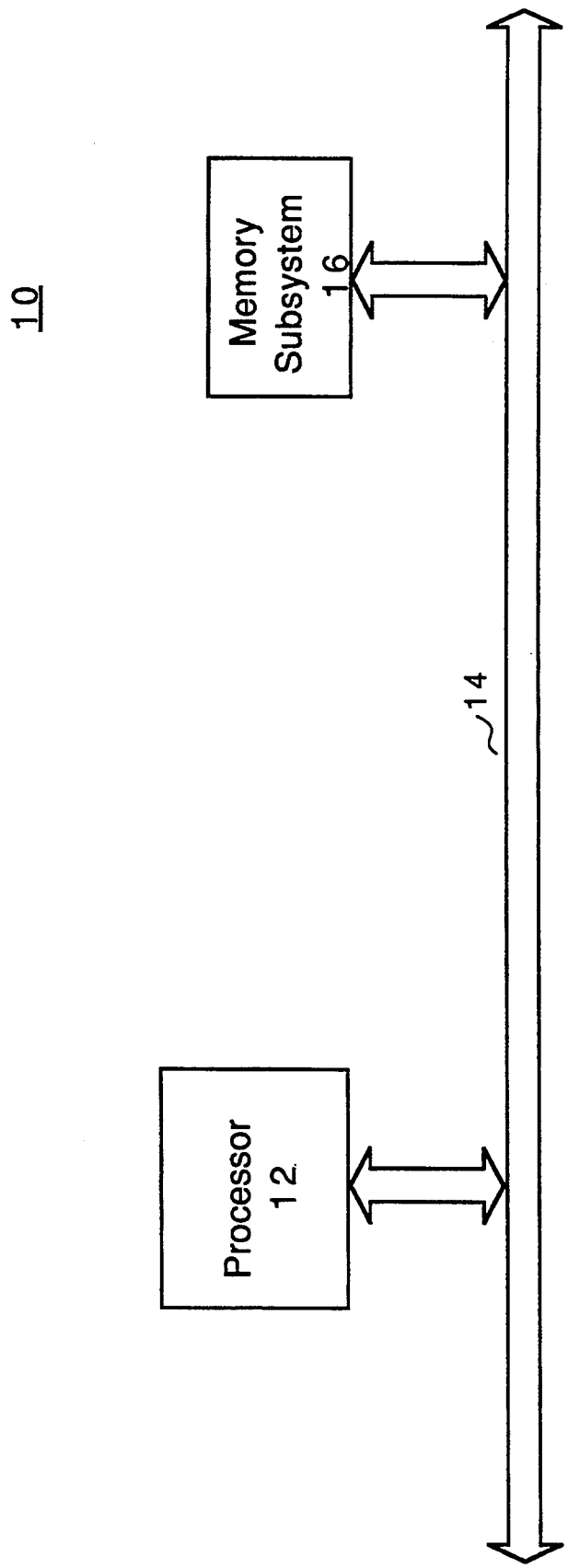
FIG. 1 illustrates a computer system comprising a processor, and a memory subsystem.

FIG. 1 illustrates a computer system 10. The computer system 10 comprises a processor 12 and a memory subsystem 16. The processor 12 and the memory subsystem 16 communicate over a host bus 14.

The processor 12 fetches a stream of instructions from the memory subsystem 16 over the host bus 14 through the cache circuit 24. The processor 12 executes the stream of instructions and maintains data storage in the memory subsystem 16.

Figure 2:
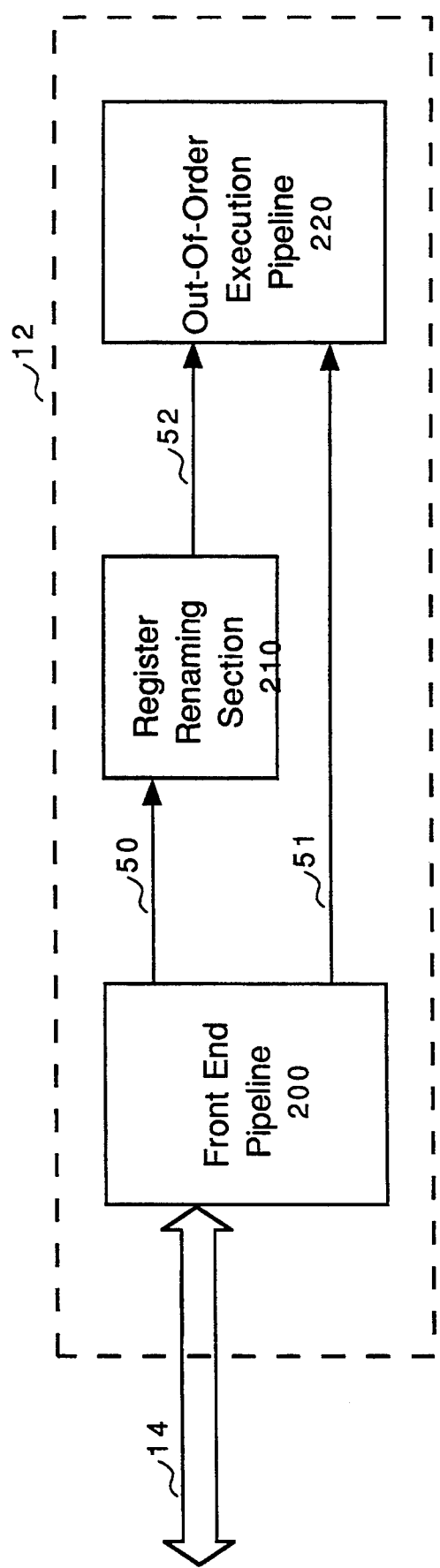
FIG. 2 is a block diagram of a processor for one embodiment wherein the processor comprises a front end pipeline, a register renaming section, and an out-of-order execution pipeline.

FIG. 2 illustrates the processor 12 for one embodiment. The processor 12 comprises a front end pipeline 200, a register renaming section 210, and an out-of-order execution pipeline 220.

The front end pipeline 200 fetches instructions over the host bus 14, performs speculative branch prediction for the instructions, and issues an in-order stream of logical micro operations, hereinafter referred to as logical micro-ops. The front end pipeline 200 generates one or more logical micro-ops for each instruction fetched from the memory subsystem 16. The front end pipeline 200 transfers the in-order stream of logical micro-ops over a logical micro-op bus 50.

The front end pipeline 200 also transfers immediate data operands over an immediate data bus 51 for instructions that specify immediate data. The front end pipeline 200 transfers immediate data operands over the immediate data bus 51, such that the immediate data operands correspond to the logical micro-ops on the logical micro-op bus 50.

For one embodiment, the instructions fetched by the front end pipeline 200 comprise Intel Architecture Microprocessor instructions. The Intel Architecture Microprocessor instructions operate on a set of architectural registers, including an EAX register, an EBX register, an ECX register, and an EDX register, etc., as well as floating-point registers.

The logical micro-ops issued by the front end pipeline 200 are reduced instruction set micro operations that perform the function of the corresponding instruction. The logical micro-ops specify arithmetic and logical operations as well as load and store operations to the memory subsystem 16. Each logical micro-op may specify at least one register source operand and at least one immediate data operand.

The register renaming section 210 receives the in-order logical micro-ops over the logical micro-op bus 50, and generates a corresponding set of in-order physical micro-ops by renaming the logical register sources and destinations of the logical micro-ops. The register renaming section 210 tracks the available resources in the out-of-order execution pipeline 220, and assigns the available resources to the physical micro-ops.

The register renaming section 210 maps the register logical register sources and the register logical register destination of each logical micro-op into physical register sources and a physical register destination, and transfers the in-order physical micro-ops over a physical micro-op bus 52. The register physical register sources of the physical micro-ops specify physical registers contained in the out-of-order pipeline 220 that buffer speculative data and committed state registers in the out-of-order pipeline 220 that buffer committed architectural state data.

The out-of-order execution pipeline 220 receives the in-order physical micro-ops over the physical micro-op bus 52 and the immediate operands over the immediate data bus 51. The out-of-order execution pipeline 220 executes the physical micro-ops according to the availability of speculative register source data and execution resources. The out-of-order execution pipeline 220 buffers the speculative result data from the out-of-order execution. The out-of-order execution pipeline 220 retires the speculative result data to an architectural state in the same order as the corresponding physical micro-ops are issued by the front end pipeline 200.

Figure 3:
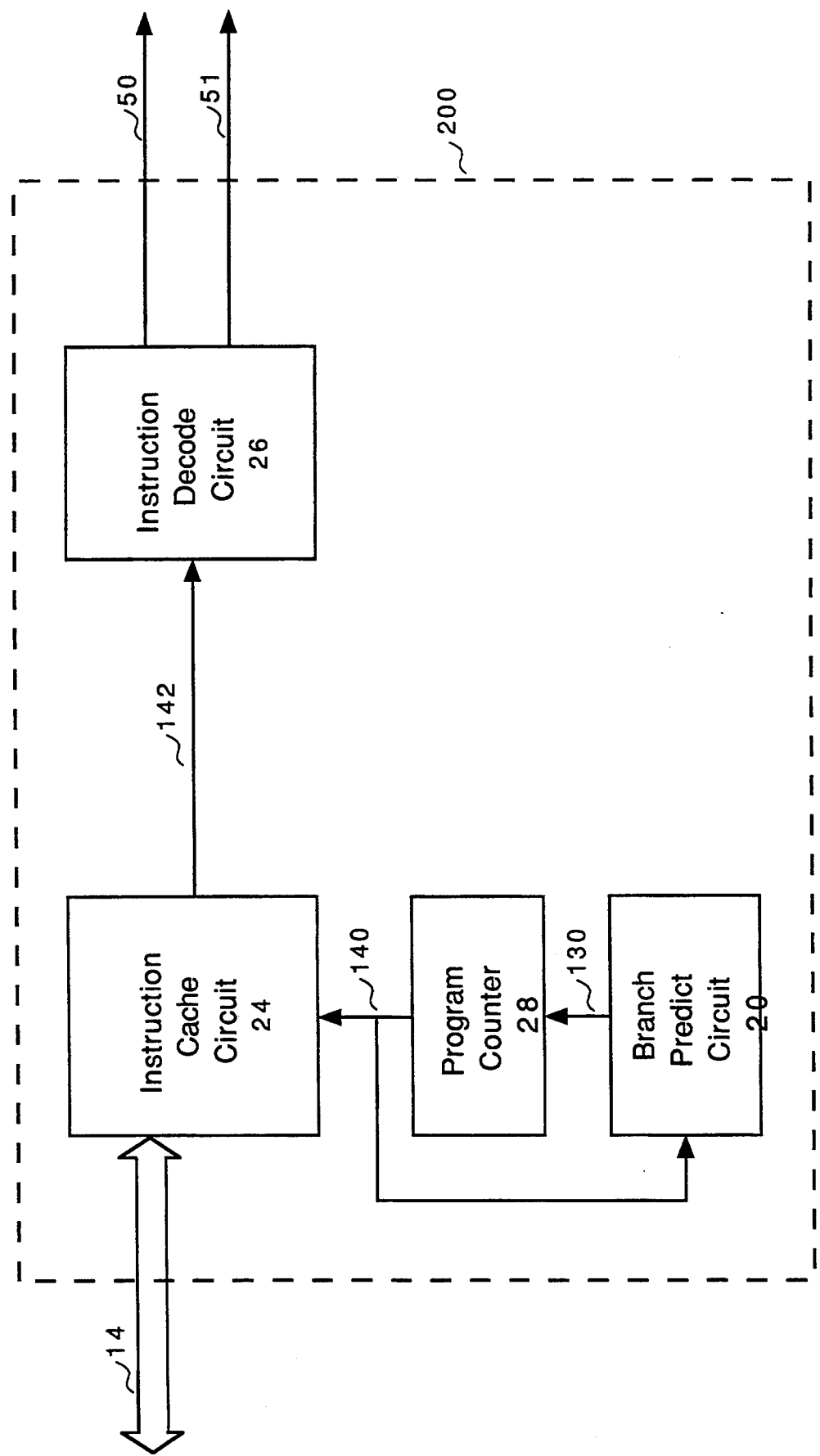
FIG. 3 illustrates the front end pipeline which comprises an instruction cache, a program counter circuit, a decode circuit, and a branch predict circuit.

FIG. 3 illustrates the front end pipeline 200 for one embodiment. The front end pipeline 200 comprises an instruction cache circuit 24, a program counter circuit 28, an instruction decode circuit 26, and a branch predict circuit 20. The instruction cache circuit 24 buffers instructions fetched from the memory subsystem 16 over the host bus 14. The instruction cache circuit 24 interfaces to the host bus 14 through a bus interface circuit (not shown).

The program counter circuit 28 controls the sequence of instruction flow from the instruction cache circuit 24. The program counter circuit 28 transfers instruction addresses over a program counter bus 140. The instruction addresses cause the instruction cache circuit 24 to transfer a stream of instructions 142 to the instruction decode circuit 26.

The branch predict circuit 20 predicts the branches in the stream of instructions accessed from the instruction cache circuit 24. The branch predict circuit 20 receives the instruction addresses on the program counter bus 140, and generates predicted target addresses based upon the instruction addresses. The branch predict circuit 20 transfers the predicted target addresses to the program counter circuit 28 over a branch target bus 130.

The instruction decode circuit 26 converts the instructions from the instruction cache circuit 24 into an in-order stream of logical micro-ops. The instruction decode circuit 26 generates one or more logical micro-ops for each instruction from the instruction cache circuit 24.

The instruction decode circuit 26 transfers the in-order stream of logical micro-ops over the logical micro-op bus 50, and transfers any corresponding immediate operands over the immediate data bus 51. For one embodiment, the instruction decode circuit 26 issues up to four in-order logical micro-ops during each clock cycle of the processor 12. Alternatively, the instruction decode circuit 26 issues up to three in-order logical micro-ops during each clock cycle of the processor 12 in-order to reduce the integrated circuit die space for implementing the processor 12.

Each logical micro-op on the logical micro-op bus 50 comprises an opcode, a pair of logical register sources and a logical register destination. The opcode specifies a function for the corresponding logical micro-op. The opcode includes a set of immediate valid flags that indicate whether the immediate data bus 151 carries an immediate operand for the corresponding logical micro-op.

Each logical register source may specify a register source for operand data, and the logical register destination may specify a register destination for result data for the corresponding logical micro-op. The register logical register sources and the logical register destinations of the logical micro-ops correspond to the architectural registers of the original instructions.

Figure 4:
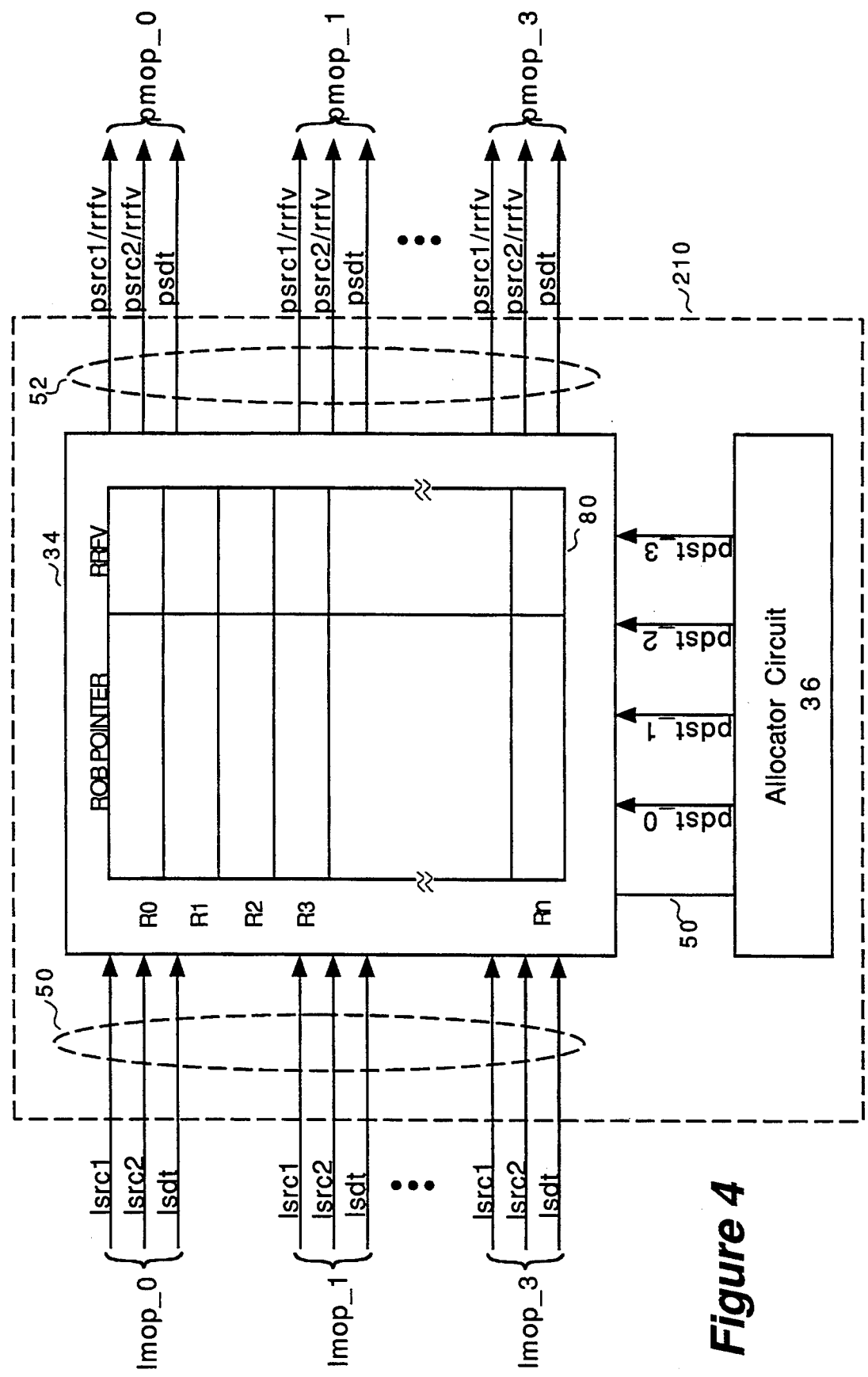
FIG. 4 illustrates the register renaming section comprising a register alias circuit and an allocator circuit.

FIG. 4 illustrates the register renaming section 210 for one embodiment. The register renaming section 210 comprises a register alias circuit 34 and an allocator circuit 36.

The register alias circuit 34 receives the in-order logical micro-ops over the logical micro-op bus 50, and generates a corresponding set of in-order physical micro-ops by renaming the logical register sources and the logical register destinations of the logical micro-ops. The allocator circuit 36 tracks the available resources the out-of-order execution pipeline 220. The allocator circuit 36 assigns resources in the out-of-order execution pipeline 220 to the physical micro-ops transferred over the physical micro-op bus 52.

The register alias circuit 34 implements a register alias table 80 that specifies whether the current state for each architectural register is speculatively held in the out-of-order execution pipeline 220 or is retired to a committed state register in the out-of-order execution pipeline 220.

The register alias table 80 enables logical to physical register renaming by mapping the logical register sources and destinations to the physical register sources and destinations. The physical register sources and destinations of the physical micro-ops specify reorder buffer (ROB) entries and committed state registers of the out-of-order execution pipeline 220.

The entries in the register alias table 80 correspond to the architectural registers R0 through Rn of thd original instruction stream. For one embodiment, the R0 through Rn entries of the register alias table 80 correspond to the EAX, EBX, ECX, and EDX, etc. registers of the Intel Architecture Microprocessor.

Each entry in the register alias table 80 stores a ROB pointer. The ROB pointer specifies a ROB entry in the out-of-order execution pipeline 220 assigned to buffer the speculative result data for the corresponding architectural register. Each entry in the register alias table 80 also stores a real register file valid (rrfv) flag that indicates whether the speculative result data for the corresponding architectural register is contained the appropriate committed state register in the out-of-order execution pipeline 220.

The allocator circuit 36 transfers a set of assigned physical register destinations pdst_0 through pdst_3 to the register alias circuit 34. The assigned physical register destinations pdst_0 through pdst_3 specify ROB entries in the out-of-order execution pipeline 220 for buffering speculative results for the physical micro-ops. The assigned physical register destinations pdst_0 through pdst_3 are used by the register alias circuit 34 to rename the logical register destinations of the logical micro-ops into physical register destinations.

The allocator circuit 36 assigns the ROB entries of the out-of-order execution pipeline 220 to the physical micro-ops in the same order that logical micro-ops are received over the logical micro-op bus 50. The allocator circuit 36 maintains an allocation pointer for allocating ROB entries.

The register alias circuit 34 receives a set of in-order logical micro-ops lmop_0 through lmop_3 over the logical micro-op bus 50 during each pipeline clock of the processor 12. Each logical micro-op lmop_0 through lmop_3 comprises an opcode, a pair of logical register sources lsrc1 and lsrc2, and a logical register destination ldst. The logical register sources and the logical register destination each specify an architectural register of the original stream of instructions.

The register alias circuit 34 transfers a corresponding set of in-order physical micro-ops pmop_0 through pmop_3 over the physical micro-op bus 52. Each physical micro-op comprises the opcode of the corresponding logical micro-op, a pair of physical register sources psrc1 and psrc2, and a physical register destination pdst. Each physical register destination pdst specifies a ROB entry in the out-of-order execution pipeline 220 to hold speculative result data for the corresponding physical micro-op.

The physical register sources psrc1 and psrc2 each specify a ROB entry or a committed state register in the out-of-order execution pipeline 220. Each physical register sources psrc1 and psrc2 on the physical micro-op bus 52 includes a corresponding rrfv flag. The rrfv flag indicates whether the corresponding physical register source specifies a ROB entry or a committed state register.

The register alias circuit 34 generates the physical micro-ops by mapping the logical register sources of the logical micro-ops to the ROB entries and the committed state registers of the out-of-order execution pipeline 220 according to the register alias table 80. The register alias circuit 34 merges assigned physical register destinations pdst_0 through pdst_3 into the physical register destinations pdst of the physical micro-ops pmop_0 through pmop_3.

The register alias circuit 34 determines a physical register source for a physical micro-op by reading the register alias table 80 entry specified by the corresponding logical register source. If the rrfv flag of the specified register alias table 80 entry is not set, then the register alias circuit 34 transfers the ROB pointer from the specified register alias table 80 entry along with the corresponding rrfv flag over the physical micro-op bus 52 as the physical register source. If the rrfv flag of the specified entry is set, then the register alias circuit 34 transfers a pointer to the committed state register in the real register file 44 that corresponds to the logical register source, and transfers the corresponding rrfv flag over the physical micro-op bus 52 as the physical register source.

The register alias circuit 34 stores the physical register destinations pdst_0 through pdst_3 into the ROB pointer fields of the register alias table 80 entries specified by the logical register destinations ldst of the logical micro-ops lmop_0 through lmop_3, and clears the corresponding rrfv flags. The clear rrfv flag indicates that the current state of the corresponding architectural registers are assigned to ROB entries in the out-of-order execution pipeline 220 as specified by the corresponding ROB pointers.

For example, the register alias circuit 34 generates the physical register source psrc1 for the physical micro-op pmop_0 by reading the register alias table 80 entry specified by the logical register source lsrc1 of the lmop_0. If the rrfv flag of the specified register alias table 80 entry is not set, then the register alias circuit 34 transfers the ROB pointer from the specified register alias table 80 entry along with the corresponding rrfv flag over the physical micro-op bus 52 as the physical register source psrc1 for the pmop_0. If the rrfv flag of the specified register alias table 80 entry is set, then the register alias circuit 34 transfers a pointer to the committed state register that corresponds to the logical register source lsrc1 along with the rrfv flag over the physical micro-op bus 52 as the physical register source psrc1 for the pmop_0.

The register alias circuit 34 generates the physical register source psrc2 for the physical micro-op pmop_0 by reading the register alias table 80 entry specified by the logical register source lsrc2 of the lmop_0. If the rrfv flag of the specified register alias table 80 entry is not set, then the register alias circuit 34 transfers the ROB pointer from the specified entry along with the corresponding rrfv flag over the physical micro-op bus 52 as the physical register source psrc2 for the pmop_0. If the rrfv flag is set, then the register alias circuit 34 transfers a pointer to the committed state register that corresponds to the logical register source lsrc2 along with the rrfv flag over the physical micro-op bus 52 as the physical register source psrc2 for the pmop_0.

The register alias circuit 34 stores the allocated physical register destination pdst_0 into the ROB pointer field of the register alias table 80 entry specified by the logical register destination ldst of the lmop_0, and clears the corresponding rrfv flag. The register alias circuit 34 also transfers the allocated physical register destination pdst_0 over the physical micro-op bus 52 as the physical destination pdst for the physical micro-op pmop_0.

Figure 5:
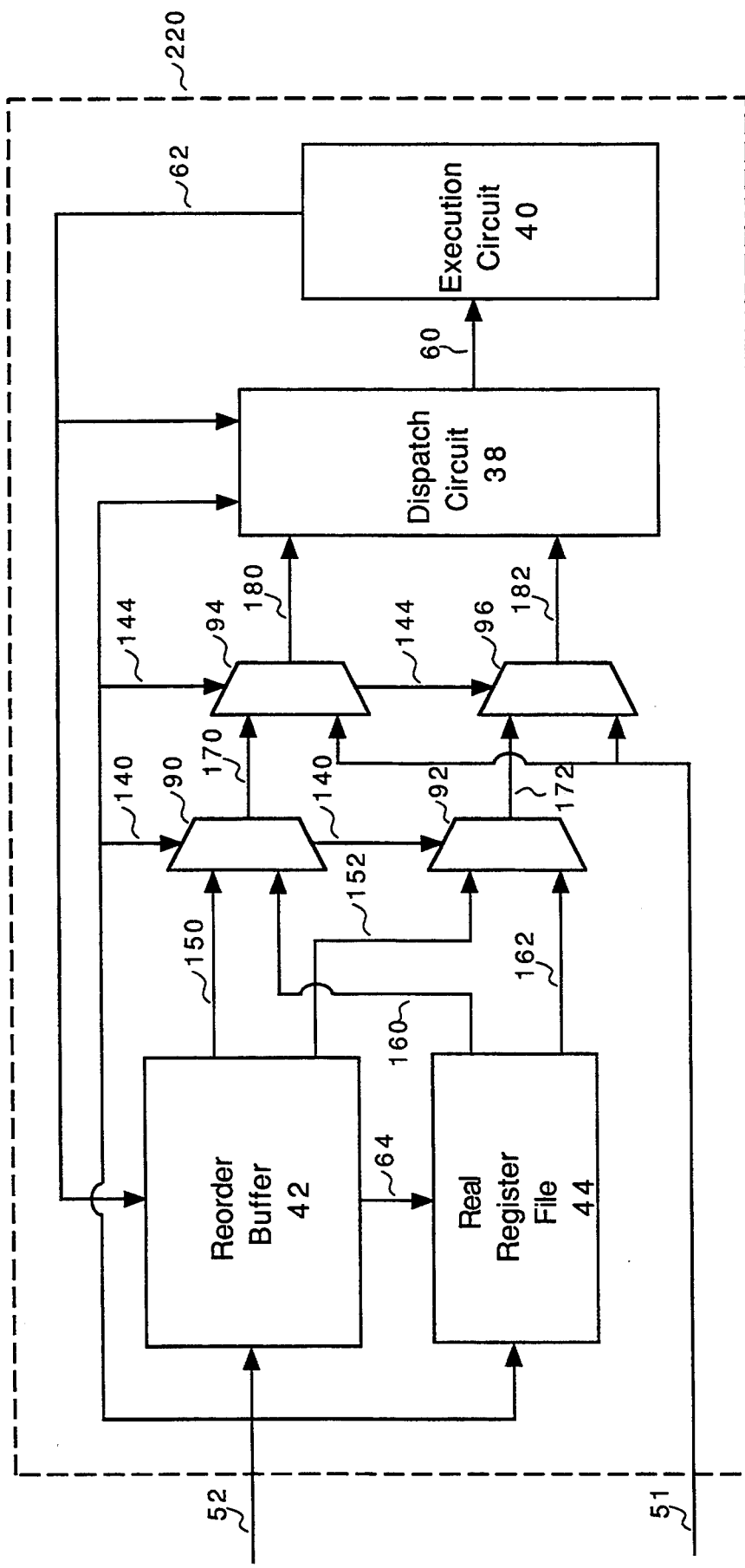
FIG. 5 illustrates the out-of-order execution pipeline which comprises a reorder buffer, a real register file, a dispatch circuit, and an execution circuit.

FIG. 5 illustrates the out-of-order execution pipeline 220 for one embodiment. The out-of-order execution pipeline 220 comprises a reorder buffer 42, a real register file 44, a dispatch circuit 38, and an execution circuit 40.

The dispatch circuit 38 buffers the physical micro-ops awaiting execution by an execution circuit 40. The dispatch circuit 38 receives the opcodes and physical register destinations for the physical micro-ops over the physical micro-op bus 52 and stores the opcodes and physical register destinations into reservation station entries assigned by the allocator circuit 36. The dispatch circuit 38 assembles source data for the physical micro-ops, and dispatches the physical micro-ops to appropriate execution units in the execution circuit 40 according to availability of source data and execution resources.

The reorder buffer 42 contains the ROB entries that buffer speculative results for the physical micro-ops. Each ROB entry in the reorder buffer 42 can buffer either integer or floating-point result data values. Each ROB entry contains a valid flag that indicates whether the corresponding result data value is valid.

The real register file 44 contains committed state registers that hold the committed state of the architectural registers of the original stream of instructions. The committed result data values in the committed state registers always provide valid source data.

The reorder buffer 42 and the real register file 44 receive the physical micro-ops over the physical micro-op bus 52. The physical register sources psrc1 and psrc2 of each physical micro-op can each specify either a ROB entry in the reorder buffer 42 or a committed state register in the real register file 44. Each physical register source psrc1 and psrc2 on the physical micro-op bus 52 includes a real register file valid (rrfv) flag that indicates whether the corresponding physical register source specifies a ROB entry or a committed state register.

The reorder buffer 42 reads the result data values and corresponding valid flags from the ROB entries specified by the physical register sources psrc1 and psrc2 of each physical micro-op pmop_0 through pmop_3. The reorder buffer 42 transfers the result data values and corresponding valid flags specified by the physical register source psrc1 of each physical micro-op pmop_0 through pmop_3 over a source one data bus 150 as speculative register source data values and valid flags. The reorder buffer 42 transfers the result data values and valid flags from the ROB entries specified by the physical register source psrc2 of each physical micro-op pmop_0 through pmop_3 over a source two data bus 152 as speculative register source data values and valid flags.

The real register file 44 reads the result data values from the committed state registers specified by the physical register sources psrc1 and psrc2 of each physical micro-op pmop_0 through pmop_3. The real register file 44 transfers the result data values specified by the physical register source psrc1 of each physical micro-op pmop_0 through pmop_3 over a source one data bus 160 as committed state register source data values. The real register file 44 transfers the result data values specified by the physical register source psrc2 of each physical micro-op pmop_0 through pmop_3 over a source two data bus 162 as committed state register source data values. The real register file 44 also transfers valid flags over the source one data bus 160 the source two data bus 162 to indicate that the committed state register source data values are valid.

The physical register destinations of the physical micro-ops on the physical micro-op bus 52 specify ROB entries in the reorder buffer 42 for buffering result data from execution of the physical micro-ops. The reorder buffer 42 clears the ROB entries specified by the physical register destinations pdst of each physical micro-op pmop_0 through pmop_3. The reorder buffer 42 then stores the logical register destinations of the physical micro-ops into the newly allocated ROB entries.

A multiplexer circuit 90 selectively couples the speculative register source data values and valid flags on the source one data bus 150 and the committed state register source data values and valid flags on the source one data bus 160 onto a register source one data bus 170. The selections of the multiplexer 90 are controlled by the rrfv flags 140. The rrfv flags 140 are the rrfv flags of the physical micro-ops pmop_0 through pmop_3 on the physical micro-op bus 52. The multiplexer 90 selects each committed state register source data value and valid flag that corresponds to a physical register source psrc1 having a an rrfv flag set. The multiplexer 90 selects each speculative register source data value and valid flag that corresponds to a physical register source psrc1 having a corresponding rrfv flag not set.

Similarly, a multiplexer circuit 92 selectively couples the speculative register source data values and valid flags on the source two data bus 152 and the committed state register source data values and valid flags on the source two data bus 162 onto a register source two data bus 172 under control of the rrfv flags 140. The multiplexer 92 selects each committed state register source data value and corresponding valid flag specified by a physical register source psrc2 having an rrfv flag set. The multiplexer 92 selects each speculative register source data value and corresponding valid flag specified by a physical register source psrc2 having an rrfv flag not set.

A multiplexer 94 selectively couples the register source data values and corresponding valid flags on the register source one data bus 170 and the immediate operands on the immediate data bus 51 onto a source one data bus 180. The selections of the multiplexer 94 are controlled by a set of immediate valid flags 144. The immediate valid flags 144 are the immediate valid flags of the opcodes of the physical micro-ops on the physical micro-op bus 52.

The immediate valid flags 144 comprise a source one immediate valid flag and a source two immediate valid flag for each physical micro-op on the physical micro-op bus 52. Each source one immediate valid flag indicates whether the immediate data bus 51 carries a source one immediate operand for the corresponding physical micro-op. Each source two immediate valid flag indicates whether the immediate data bus 51 carries a source two immediate operand for the corresponding physical micro-op.

The immediate operands on the immediate data bus 51 provide valid source data if present. Each source one and source two immediate operand on the immediate data bus 51 includes a corresponding valid flag which indicates a valid source data value.

The multiplexer 94 selects each register source data value and valid flags on the register source one data bus 170 that corresponds to a physical micro-op having a source one immediate valid flag not set. The multiplexer 94 selects each source one immediate operand and valid flag on the immediate data bus 51 that corresponds to a physical micro-op having a source one immediate valid flag set.

A multiplexer 96 selectively couples the register source data values and valid flags on the register source two data bus 172 and the immediate operands and valid flags on the immediate data bus 51 onto a source two data bus 182 under control of the immediate valid flags 144. The multiplexer 96 selects each register source data value and valid flag on the register source two data bus 172 that corresponds to a physical micro-op having a source two immediate valid flag not set. The multiplexer 96 selects each source two immediate operand and valid flag on the immediate data bus 51 that corresponds to a physical micro-op having a source two immediate valid flag set.

The dispatch circuit 38 receives the source data values and corresponding valid flags over the source one data bus 180 and the source two data bus 182. The dispatch circuit 38 stores the source data values and corresponding valid flags into the reservation station entries assigned to the corresponding physical micro-ops.

The dispatch circuit 38 also receives source data values and corresponding valid flags for the pending physical micro-ops from the execution circuit 40 over a result bus 62 during a write back of result data values from the execution circuit 40 to the reorder buffer 42. The dispatch circuit 38 stores the write back source data values and corresponding valid flags into the reservation station entries assigned to the corresponding physical micro-ops.

The dispatch circuit 38 schedules the physical micro-ops having completely assembled source data values for execution. The dispatch circuit 38 dispatches the ready physical micro-ops to the execution circuit 40 over a micro-op dispatch bus 60. The dispatch circuit 38 schedules execution of physical micro-ops out-of-order according to the availability of the source data values for the physical micro-ops, and according to the availability of execution unit resources in the execution circuit 40.

The execution circuit 40 writes back the speculative result data values from the out-of-order execution of the physical micro-ops to the reorder buffer 42 over the result bus 62. The writes back of speculative result data values by the execution circuit 40 is out-of-order due to the out-of-order dispatching of physical micro-ops by the dispatch circuit 38 and the differing number of processor cycles of the processor 12 required for execution of the differing types of physical micro-ops.

For one embodiment, the execution circuit 40 comprises a set of five execution units, and the dispatch circuit 38 dispatches up to five physical micro-ops concurrently to the execution circuit 40 over the micro-op dispatch bus 60.

The speculative results held in the physical registers of the reorder buffer 42 are committed to an architectural state in the same order as the original logical micro-ops were received. During a retirement operation, the reorder buffer 42 transfers the speculative result data values from a sequential set of ROB entries to the corresponding committed state registers of the real register file 44 over a retirement bus 64.

Figure 6:
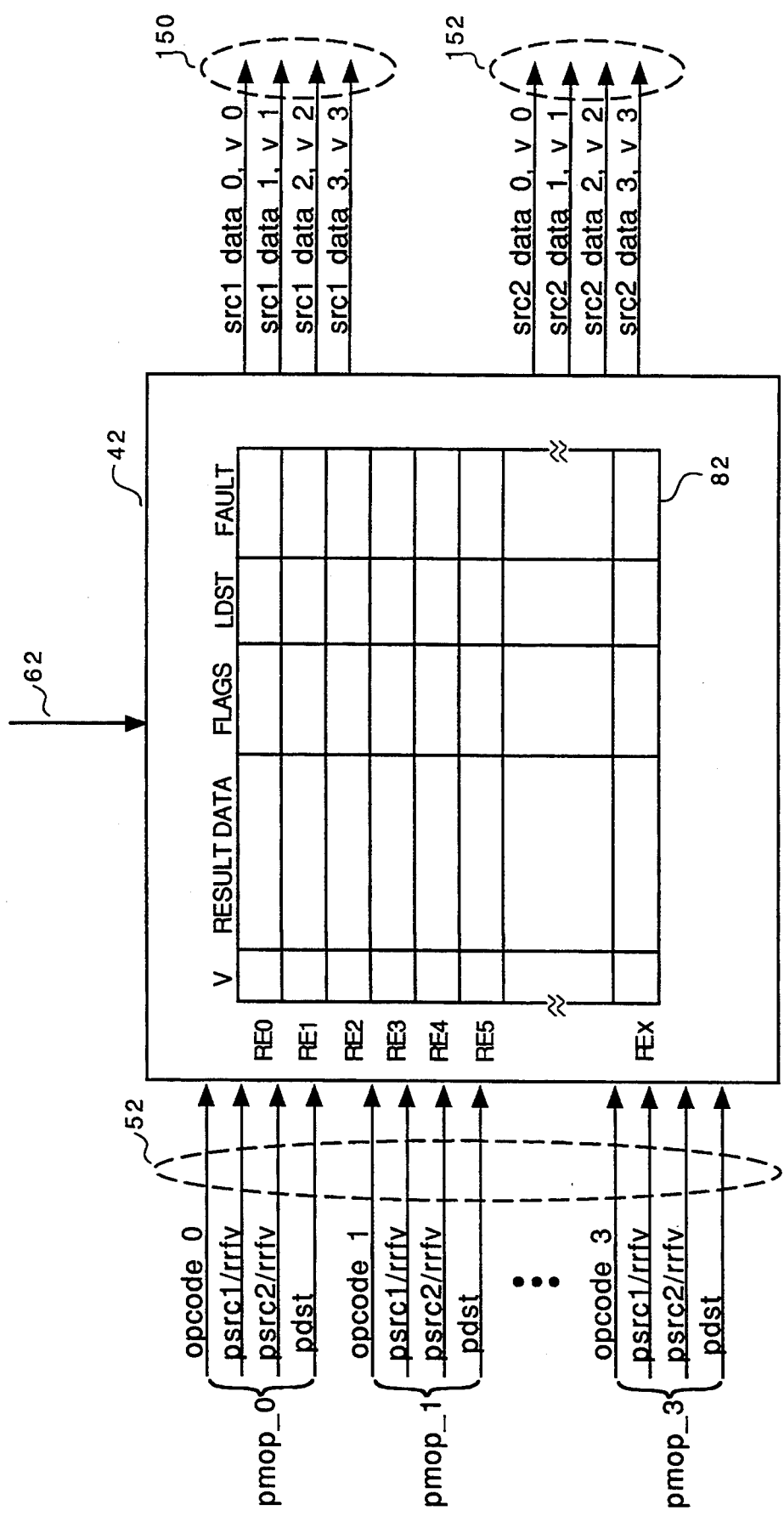
FIG. 6 illustrates the reorder buffer for one embodiment which implements a reorder buffer (ROB) register file comprising a set of ROB entries.

FIG. 6 illustrates the reorder buffer 42 for one embodiment. The reorder buffer 42 implements a reorder buffer (ROB) register file 82 comprising a set of ROB entries (RE0 through REx). The ROB entries RE0 through REx buffer speculative result data values from the out-of-order execution of corresponding physical micro-ops. Each ROB entry comprises a valid flag (V), a result data value, a set of flags, a logical register destination (LDST), and fault data.

For one embodiment, the ROB entries RE0 through REx comprise a set of 64 physical registers. For another embodiment that minimizes integrated circuit chip area for the processor 12, the ROB entries RE0 through REx comprise a set of 40 physical registers.

The valid flag of each ROB entry indicates whether the corresponding result data value is valid. The valid flag is set during the result write back to the ROB entry from the execution circuit 40. The reorder buffer 42 clears the valid flag for each newly allocated ROB entry to indicate an invalid result data.

The result data value of each ROB entry is a speculative result from the out-of-order execution of the corresponding physical micro-op. The result data value may be either an integer data value or a floating-point data value. For one embodiment, the result data value field of each ROB entry RE0 through REx comprises 86 bits to accommodate both integer and floating-point data values.

The flags of each ROB entry provide speculative architectural flag information. The speculative architectural flag information is transferred to the architectural flags of the real register file 44 upon retirement of the corresponding ROB entry.

The logical register destination LDST of each ROB entry specifies a committed state register in the real register file 44. The result data value of the corresponding ROB entry is transferred to the committed state register specified by LDST during retirement of the ROB entry.

The fault data of each ROB entry contains fault information from execution of the corresponding physical micro-op.

The reorder buffer 42 receives the physical micro-ops pmop_0 through pmop_3 over the physical micro-op bus 52. The reorder buffer 42 reads the ROB entries specified by the physical register sources psrc1 and psrc2 of the physical micro-ops from the ROB register file 82 according to the immediate valid flags of the opcodes. The reorder buffer 42 transfers the result data values and the valid flags from the specified ROB entries over the source one data bus 150 and the source two data bus 152.

The reorder buffer 42 reads the result data values and valid flags from the ROB entries specified by the physical register source psrc1 of each physical micro-op pmop_0 through pmop_3 having a corresponding source one immediate valid flag that does not indicate an immediate operand. The reorder buffer 42 transfers the result data values and valid flags over the source one data bus 150. The src1 data_0 on the source one data bus 150 is the result data value and the v_0 is the valid flag from the ROB entry specified by the physical register source psrc1 of the physical micro-op pmop_0. The src1 data_1, v_1 through src1 data_3, v_3 on the source one data bus 150 are the result data values and corresponding valid flags from the ROB entries specified by the physical register sources psrc1 of the physical micro-ops pmop_1 through pmop_3, respectively.

The reorder buffer 42 reads the result data values and valid flags from the ROB entries specified by the physical register source psrc2 of each physical micro-op pmop_0 through pmop_3 having a corresponding source two immediate valid flag that does not indicate an immediate operand. The reorder buffer 42 transfers the result data values and valid flags over the source two data bus 152. The src2 data_0, v_0 through src2 data_3, v_3 on the source two data bus 152 are the result data values and corresponding valid flags from the ROB entries specified by the physical register sources psrc2 of the physical micro-ops pmop_0 through pmop_3, respectively.

The reorder buffer 42 clears the valid flags of the ROB entries specified by the physical register destinations pdst of the physical micro-ops received over the physical micro-op bus 52. The reorder buffer 42 clears the valid flags to indicate that the corresponding result data value is not valid until the execution circuit 40 writes back results for the physical micro-ops.

The reorder buffer 42 then stores the logical register destinations into the LDST fields of the ROB entries specified by the physical register destinations of the physical micro-ops. The logical register destination in the LDST field of a ROB entry specifies a committed state register in the real register file 44 for retirement of the corresponding ROB entry.

The reorder buffer 42 receives write back results from the execution circuit 40 over the result bus 62. Each write back result on the result bus 62 comprises a result data value and corresponding valid flag, a physical register destination, and fault data.

The reorder buffer 42 stores the write back results from the execution circuit 40 into the ROB entries specified by the physical register destinations on the result bus 62. The reorder buffer 42 stores the result data value and corresponding valid flag into the result data value and valid flag fields, and stores the fault data into the fault data field of the ROB entry specified by the physical register destination.

The write back valid flag from the execution circuit 40 sets the valid flag in the specified ROB entry. The write back valid flag indicates that the ROB entry contains a valid result data value from execution of the corresponding physical micro-op.

Figure 7:
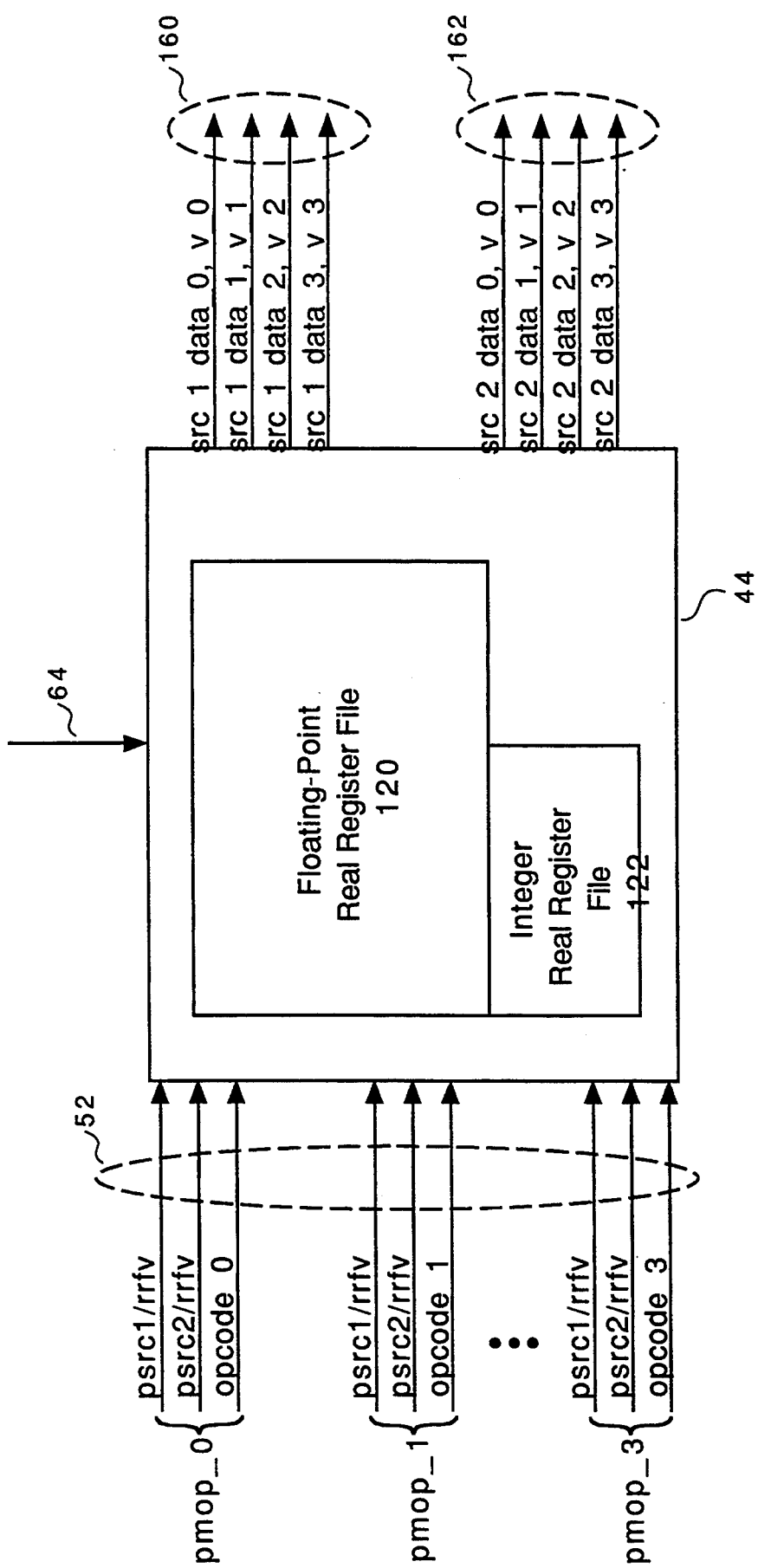
FIG. 7 illustrates the real register file for one embodiment which implements a set of committed state registers that hold committed result data values.

FIG. 7 illustrates the real register file 44 for one embodiment. The real register file 44 implements a set of committed state registers that hold committed result data values. The committed state registers in real register file 44 comprise a floating-point register file 120 and an integer real register file 122.

The committed state registers buffer committed results for the architectural registers of the original stream of instructions. For one embodiment, the committed state registers of the real register file 44 comprise the EAX, EBX, ECX, and EDX registers, etc. and architectural flags of the Intel Architecture Microprocessor.

The real register file 44 receives the physical micro-ops pmop_0 through pmop_3 over the physical micro-op bus 52. The real register file 44 reads the committed state registers specified by the physical register sources psrc1 and psrc2 of the physical micro-ops from the floating-point register file 120 and the integer real register file 122 according to the immediate valid flags. The real register file 44 transfers the committed result data values from the committed state registers over the source one data bus 160 and the source two data bus 162. The real register file 44 also transfers a valid flag for each committed result data value to the dispatch circuit 38 over the source one data bus 160 and the source two data bus 162. The valid flags from the committed state registers always indicate valid source data values.

The real register file 44 reads the committed result data values and valid flags from the committed state registers specified by the physical register source psrc1 of each physical micro-op pmop_0 through pmop_3 having a corresponding source one immediate valid flag that does not indicate an immediate operand. The real register file 44 transfers the committed result data values and valid flags over the source one data bus 160. The src1 data_0, v_0 through src1 data_3, v_3 on the source one data bus 160 are the committed result data values and corresponding valid flags from the committed state registers specified by the physical register sources psrc1 of the physical micro-ops pmop_1 through pmop_3, respectively.

The real register file 44 transfers the committed result data values and valid flags from the committed state registers specified by the physical register source psrc2 of each physical micro-op pmop_0 through pmop_3 having a corresponding source two immediate valid flag that does not indicate an immediate operand. The real register file 44 transfers the result data values and valid flags over the source two data bus 162. The src2 data_0, v_0 through src2 data_3, v_3 on the source two data bus 162 are the committed result data values and corresponding valid flags from the committed state registers specified by the physical register sources psrc2 of the physical micro-ops pmop_0 through pmop_3, respectively.

Figure 8:
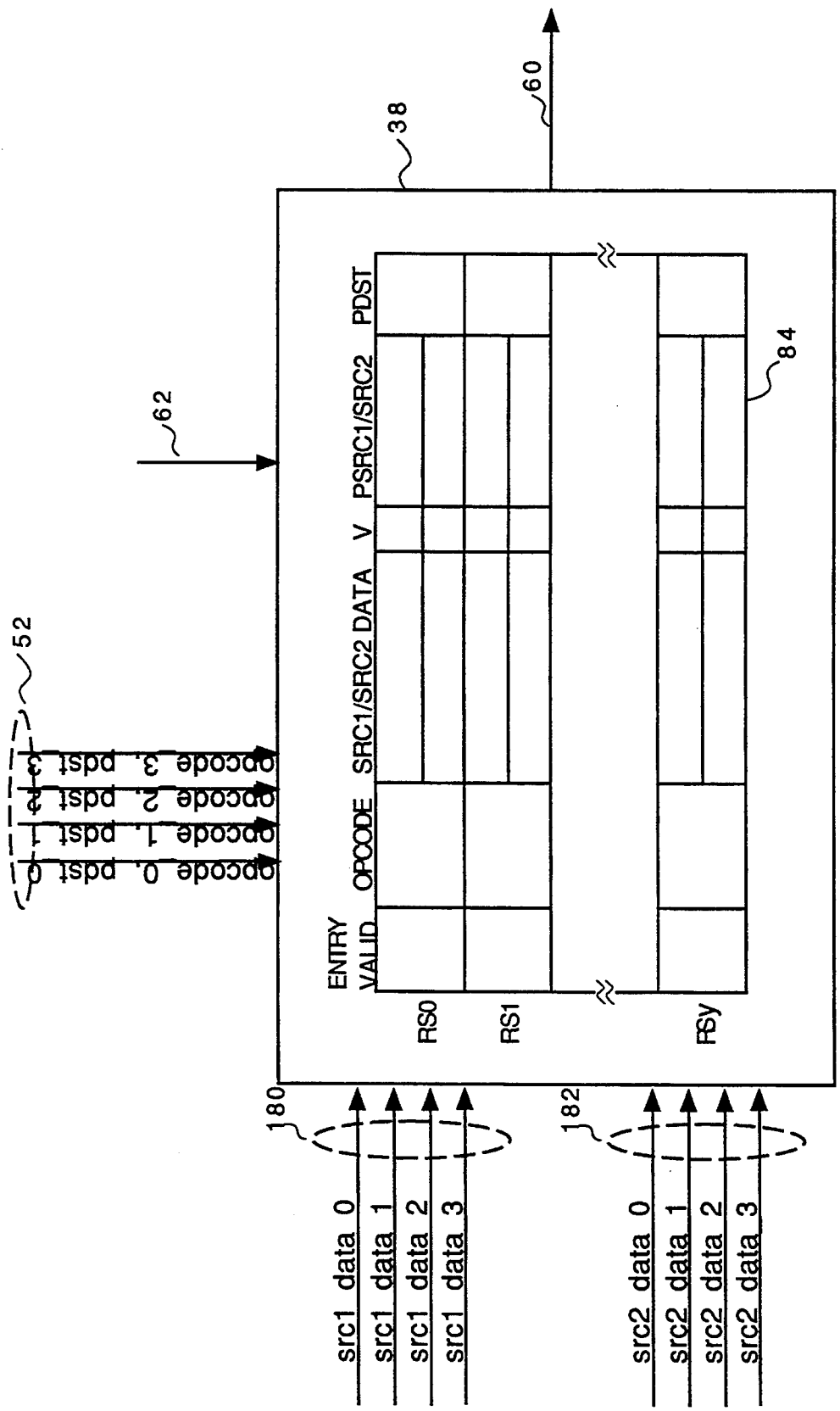
FIG. 8 illustrates the dispatch circuit for one embodiment which implements a dispatch table comprising a set of reservation station entries.

FIG. 8 illustrates the dispatch circuit 38 for one embodiment. The dispatch circuit 38 implements a dispatch table 84 comprising a set of reservation station entries RS0 through RSy. Each reservation station entry RS0 through RSy comprises an entry valid flag, an op code, a pair of source data values (SRC1/SRC2 DATA) and corresponding source data valid flags (V), a pair of physical register sources (PSRC1/PSRC2), and a physical register destination (PDST).

The dispatch circuit 38 receives the opcodes opcode_0 through opcode_3 and physical register destinations pdst_0 through pdst_3 for the physical micro-ops pmop_0 through pmop_3 over the physical micro-op bus 52, and stores the opcodes and physical destinations into the reservation station entries RS0 through RSy assigned by the allocator circuit 36. The dispatch circuit 38 assembles the source data for the physical micro-ops into the reservation station entries RS0 through RSy, and dispatches the ready physical micro-ops to the execution circuit 40. A physical micro-op is ready when the source data is fully assembled in a reservation station entry.

The entry valid flag indicates whether the corresponding reservation station entry RS0 through RSy holds a physical micro-op awaiting dispatch.

The op code specifies an operation of the execution unit circuit 40 for the physical micro-op in the corresponding reservation station entry RS0 through RSy.

The SRC1/SRC2 DATA fields of the reservation station entries RS0 through RSy hold the source data values for the corresponding physical micro-ops. The corresponding source data valid flags V indicate whether the source data values are valid.

The physical register destination PDST of each reservation station entry RS0 through RSy specifies a ROB entry in the reorder buffer 42 to hold the speculative results for the corresponding physical micro-op.

The physical register sources PSRC1/PSRC2 of each reservation station entry RS0 through RSy specify the ROB entries in the reorder buffer 42 that are assigned to hold the source data for the corresponding physical micro-op. The dispatch circuit 38 uses the physical register sources PSRC1/PSRC2 to detect write back of pending source data from the execution circuit 40 to the reorder buffer 42.

The dispatch circuit 38 receives the source data values src1 data_0 through src1 data_3 and corresponding valid flags v_0 through v_3 over the source one data bus 180 and the source data values src2 data_0 through src2 data_3 and corresponding valid flags v_0 through v_3 over the source two data bus 182. The dispatch circuit 38 transfers the source data values and valid flags into the SRC1/SRC2 DATA fields and source data valid flag fields of the newly allocated reservation station entries assigned to the physical micro-ops pmop_0 through pmop_3.

If the source data valid flags indicate that one or both of the source data values for a reservation station table entry is invalid, the dispatch circuit 38 waits for the execution circuit 40 to execute previously dispatched physical micro-ops and generate the required source data values.

The dispatch circuit 38 monitors the physical register destinations on the result bus 62 as the execution circuit 40 writes back result data values to the reorder buffer 42. If a physical register destination on the result bus 62 corresponds to the physical register destination of pending source data for a reservation station table entry RS0 through RSy, then the dispatch circuit 38 receives the result data value over the result bus 62 and stores the result data value into the corresponding SRC1/SRC2 DATA fields and source data valid flags. The dispatch circuit 38 dispatches the pending physical micro-ops to the execution circuit 40 if both source data values are valid.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for coordinating source data for an instruction in a processor, comprising the steps of:

receiving the instruction comprising at least one logical register source, and generating a physical register source by renaming the logical register source, such that the physical register source specifies a physical register or a committed state register;

reading a speculative result data value and a speculative source valid flag from the physical register if the physical register source specifies the physical register, the speculative source valid flag indicating whether the speculative source data value is valid;

reading a committed result data value from the committed state register if physical register source specifies the committed state register;

storing the speculative result data value into a dispatch buffer and storing the speculative source valid flag into a valid flag in the dispatch buffer if the physical register source specifies the physical register;

storing the committed result data value into the dispatch buffer and storing a committed source valid flag indicating that the committed result data value is valid into the valid flag of the dispatch buffer if the physical register source specifies the committed state register;

scheduling execution of the instruction according to the valid flag in the dispatch buffer.

2. The method of claim 1, wherein the instruction further comprises at least one immediate valid flag, the immediate valid flag indicating whether the instruction includes an immediate operand.

3. The method of claim 2, further comprising the step of storing the immediate operand into the dispatch buffer and storing an immediate operand valid flag indicating that the immediate operand is valid into the valid flag of the dispatch buffer if the immediate valid flag specifies the immediate operand.

4. The method of claim 1, wherein the physical register source comprises a register pointer and a real register valid flag, the real register valid flag indicating whether the register pointer specifies the physical register or the committed state register.

5. The method of claim 1, wherein the speculative source valid flag indicates whether the speculative source data value is a speculative result data value has been produced by completed execution of another instruction.

6. The method of claim 1, wherein each instruction comprises a source one immediate valid flag, a source two immediate valid flag, a first logical register source, and a second logical register source, the source one and source two immediate valid flags indicating whether the instruction includes an immediate operand.

7. The method of claim 6, wherein the step of generating a physical register source by renaming the logical register source comprises the steps of generating a first physical register source by renaming the first logical register source and generating a second physical register source by renaming the second logical register source, such that the first and second physical register sources each specify a physical register or a committed state register.

8. The method of claim 7, wherein the step of reading a speculative result data value and a speculative source valid flag from the physical register comprises the steps of reading a first speculative result data value and a first speculative source valid flag from the first physical register if the first physical register source specifies the first physical register, and reading a second speculative result data value and a second speculative source valid flag from the second physical register if the second physical register source specifies the second physical register.

9. The method of claim 8, wherein the step of reading a committed result data value from the committed state register comprises the steps of reading a first committed result data value from the first committed state register if the first physical register source specifies the first committed state register, and reading a second committed result data value from the second committed state register if the second physical register source specifies the second committed state register.

10. The method of claim 9, wherein the steps of storing the speculative result data value into a dispatch buffer and storing the speculative source valid flag into a valid flag in the dispatch buffer and storing the committed result data value into the dispatch buffer and storing a committed source valid flag indicating that the committed result data value is valid into the valid flag of the dispatch buffer comprises the steps of:

storing the immediate operand into the dispatch buffer and storing the source one immediate valid flag into the valid flag in the dispatch buffer if the source one immediate valid flag indicates that the immediate operand replaces the first speculative result data value;

storing the first speculative result data value into the dispatch buffer and storing the first speculative source valid flag into the valid flag in the dispatch buffer if the first physical register source specifies the first physical register and if the source one immediate valid flag does not indicate that the immediate operand replaces the first speculative result data value.

11. The method of claim 9, wherein the steps of storing the speculative result data value into a dispatch buffer and storing the speculative source valid flag into a valid flag in the dispatch buffer and storing the committed result data value into the dispatch buffer and storing a committed source valid flag indicating that the committed result data value is valid into the valid flag of the dispatch buffer comprises the steps of:

storing the immediate operand into the dispatch buffer and storing the source two immediate valid flag into the valid flag in the dispatch buffer if the source two immediate valid flag indicates that the immediate operand replaces the second speculative result data value;

storing the second speculative result data value into the dispatch buffer and storing the second speculative source valid flag into the valid flag in the dispatch buffer if the second physical register source specifies the second physical register and if the source two immediate valid flag does not indicate that the immediate operand replaces the second speculative result data value.

12. An apparatus for coordinating source data for an instruction in a processor, comprising:

means for receiving the instruction comprising at least one logical register source, and generating a physical register source by renaming the logical register source, such that the physical register source specifies a physical register or a committed state register;

means for reading a speculative result data value and a speculative source valid flag from the physical register if the physical register source specifies the physical register, the speculative source valid flag indicating whether the speculative source data value is valid;

means for reading a committed result data value from the committed state register if physical register source specifies the committed state register;

means for storing the speculative result data value into a dispatch buffer and storing the speculative source valid flag into a valid flag in the dispatch buffer if the physical register source specifies the physical register;

means for storing the committed result data value into the dispatch buffer and storing a committed source valid flag indicating that the committed result data value is valid into the valid flag of the dispatch buffer if the physical register source specifies the committed state register;

means for scheduling execution of the instruction according to the valid flag in the dispatch buffer.

13. The apparatus of claim 12, wherein the instruction further comprises at least one immediate valid flag, the immediate valid flag indicating whether the instruction includes an immediate operand.

14. The apparatus of claim 13, further comprising means for storing the immediate operand into the dispatch buffer and storing an immediate operand valid flag indicating that the immediate operand is valid into the valid flag of the dispatch buffer if the immediate valid flag specifies the immediate operand.

15. The apparatus of claim 12, wherein the physical register source comprises a register pointer and a real register valid flag, the real register valid flag indicating whether the register pointer specifies the physical register or the committed state register.

16. The apparatus of claim 12, wherein the speculative source valid flag indicates whether the speculative source data value is a speculative result data value has been produced by completed execution of another instruction.

17. The apparatus of claim 12, wherein each instruction comprises a source one immediate valid flag, a source two immediate valid flag, a first logical register source, and a second logical register source, the source one and source two immediate valid flags indicating whether the instruction includes an immediate operand.

18. The apparatus of claim 12, wherein the means for generating a physical register source by renaming the logical register source comprises means for generating a first physical register source by renaming the first logical register source and generating a second physical register source by renaming the second logical register source, such that the first and second physical register sources each specify a physical register or a committed state register.

19. The apparatus of claim 18, wherein the means for reading a speculative result data value and a speculative source valid flag from the physical register comprises means for reading a first speculative result data value and a first speculative source valid flag from the first physical register if the first physical register source specifies the first physical register, and reading a second speculative result data value and a second speculative source valid flag from the second physical register if the second physical register source specifies the second physical register.

20. The apparatus of claim 19, wherein the means for reading a committed result data value from the committed state register comprises means for reading a first committed result data value from the first committed state register if the first physical register source specifies the first committed state register, and reading a second committed result data value from the second committed state register if the second physical register source specifies the second committed state register.

21. The apparatus of claim 20, wherein the means for storing the speculative result data value into a dispatch buffer and storing the speculative source valid flag into a valid flag in the dispatch buffer and storing the committed result data value into the dispatch buffer and storing a committed source valid flag indicating that the committed result data value is valid into the valid flag of the dispatch buffer comprises:

means for storing the immediate operand into the dispatch buffer and storing the source one immediate valid flag into the valid flag in the dispatch buffer if the source one immediate valid flag indicates that the immediate operand replaces the first speculative result data value;

means for storing the first speculative result data value into the dispatch buffer and storing the first speculative source valid flag into the valid flag in the dispatch buffer if the first physical register source specifies the first physical register and if the source one immediate valid flag does not indicate that the immediate operand replaces the first speculative result data value.

22. The apparatus of claim 21, wherein the means for storing the speculative result data value into a dispatch buffer and storing the speculative source valid flag into a valid flag in the dispatch buffer and storing the committed result data value into the dispatch buffer and storing a committed source valid flag indicating that the committed result data value is valid into the valid flag of the dispatch buffer comprises:

means for storing the immediate operand into the dispatch buffer and storing the source two immediate valid flag into the valid flag in the dispatch buffer if the source two immediate valid flag indicates that the immediate operand replaces the second speculative result data value;

means for storing the second speculative result data value into the dispatch buffer and storing the second speculative source valid flag into the valid flag in the dispatch buffer if the second physical register source specifies the second physical register and if the source two immediate valid flag does not indicate that the immediate operand replaces the second speculative result data value.

23. A processor, comprising:

register rename circuit receiving an instruction comprising at least one logical register source, the register rename circuit generating a physical register source by renaming the logical register source, such that the physical register source specifies a physical register or a committed state register;

reorder buffer containing the physical register, the reorder buffer receiving the physical register source from the register rename circuit and reading a speculative result data value and a speculative source valid flag from the physical register and transferring and transferring the speculative result data value and the speculative source valid flag over a speculative source data bus if the physical register source specifies the physical register, the speculative source valid flag indicating whether the speculative source data value is valid;

real register file containing the committed state register, receiving the physical register source from the register rename circuit and reading a committed result data value from the committed state register and transferring the committed result data value over a committed source data bus if physical register source specifies the committed state register;

first multiplexer coupled to the speculative source data bus and the committed source data bus, the first multiplexer transferring the speculative result data value the speculative source valid flag over a source data bus as a source data value and a valid flag if the physical register source specifies the physical register, the first multiplexer transferring the committed result data value and a committed source valid flag indicating that the committed result data value is valid over the source data bus as the source data value and the valid flag if the physical register source specifies the committed state register;

dispatch circuit receiving the source data value and the valid flag over the source data bus, the dispatch circuit storing the source data value and the valid flag and scheduling execution of the instruction according to the valid flag.

24. The processor of claim 23, wherein the instruction further comprises at least one immediate valid flag, the immediate valid flag indicating whether the instruction includes an immediate operand.

25. The processor of claim 24, further comprising a second multiplexer coupled to receive the source data value and the valid flag over the source data bus and coupled to receive the immediate operand, the second multiplexer transferring the immediate operand and an immediate operand valid flag indicating that the immediate operand is valid over the source data bus as the source data value and the valid flag if the immediate valid flag specifies the immediate operand.

26. The processor of claim 23, wherein the physical register source comprises a register pointer and a real register valid flag, the real register valid flag indicating whether the register pointer specifies the physical register or the committed state register.

27. The processor of claim 23, wherein the speculative source valid flag indicates whether the speculative source data value is a speculative result data value has been produced by completed execution of another instruction.

28. A computer system, comprising:
  memory subsystem coupled for communication over a host bus, the memory subsystem storing an instruction;
  means for fetching the instruction over the host bus, the instruction comprising at least one logical register source;
  means for generating a physical register source by renaming the logical register source, such that the physical register source specifies a physical register or a committed state register;
  means for reading a speculative result data value and a speculative source valid flag from the physical register if the physical register source specifies the physical register, the speculative source valid flag indicating whether the speculative source data value is valid;
  means for reading a committed result data value from the committed state register if physical register source specifies the committed state register;
  means for storing the speculative result data value into a dispatch buffer and storing the speculative source valid flag into a valid flag in the dispatch buffer if the physical register source specifies the physical register;
  means for storing the committed result data value into the dispatch buffer and storing a committed source valid flag indicating that the committed result data value is valid into the valid flag of the dispatch buffer if the physical register source specifies the committed state register;
  means for scheduling execution of the instruction according to the valid flag in the dispatch buffer.

29. The computer system of claim 28, wherein the instruction further comprises at least one immediate valid flag, the immediate valid flag indicating whether the instruction includes an immediate operand.

30. The computer system of claim 29, further comprising means for storing the immediate operand into the dispatch buffer and storing an immediate operand valid flag indicating that the immediate operand is valid into the valid flag of the dispatch buffer if the immediate valid flag specifies the immediate operand.

31. The computer system of claim 28, wherein the physical register source comprises a register pointer and a real register valid flag, the real register valid flag indicating whether the register pointer specifies the physical register or the committed state register.

32. The computer system of claim 28, wherein the speculative source valid flag indicates whether the speculative source data value is a speculative result data value has been produced by completed execution of another instruction.

33. The computer system of claim 28, wherein each instruction comprises a source one immediate valid flag, a source two immediate valid flag, a first logical register source, and a second logical register source, the source one and source two immediate valid flags indicating whether the instruction includes an immediate operand.

34. The computer system of claim 28, wherein the means for generating a physical register source by renaming the logical register source comprises means for generating a first physical register source by renaming the first logical register source and generating a second physical register source by renaming the second logical register source, such that the first and second physical register sources each specify a physical register or a committed state register.

35. The computer system of claim 34, wherein the means for reading a speculative result data value and a speculative source valid flag from the physical register comprises means for reading a first speculative result data value and a first speculative source valid flag from the first physical register if the first physical register source specifies the first physical register, and reading a second speculative result data value and a second speculative source valid flag from the second physical register if the second physical register source specifies the second physical register.

36. The computer system of claim 35, wherein the means for reading a committed result data value from the committed state register comprises means for reading a first committed result data value from the first committed state register if the first physical register source specifies the first committed state register, and reading a second committed result data value from the second committed state register if the second physical register source specifies the second committed state register.

37. The computer system of claim 36, wherein the means for storing the speculative result data value into a dispatch buffer and storing the speculative source valid flag into a valid flag in the dispatch buffer and storing the committed result data value into the dispatch buffer and storing a committed source valid flag indicating that the committed result data value is valid into the valid flag of the dispatch buffer comprises:
  means for storing the immediate operand into the dispatch buffer and storing the source one immediate valid flag into the valid flag in the dispatch buffer if the source one immediate valid flag indicates that the immediate operand replaces the first speculative result data value;
  means for storing the first speculative result data value into the dispatch buffer and storing the first speculative source valid flag into the valid flag in the dispatch buffer if the first physical register source specifies the first physical register and if the source one immediate valid flag does not indicate that the immediate operand replaces the first speculative result data value.

38. The computer system of claim 37, wherein the means for storing the speculative result data value into a dispatch buffer and storing the speculative source valid flag into a valid flag in the dispatch buffer and storing the committed result data value into the dispatch buffer and storing a committed source valid flag indicating that the committed result data value is valid into the valid flag of the dispatch buffer comprises:

- means for storing the immediate operand into the dispatch buffer and storing the source two immediate valid flag into the valid flag in the dispatch buffer if the source two immediate valid flag indicates that the immediate operand replaces the second speculative result data value;
- means for storing the second speculative result data value into the dispatch buffer and storing the second speculative source valid flag into the valid flag in the dispatch buffer if the second physical register source specifies the second physical register and if the source two immediate valid flag does not indicate that the immediate operand replaces the second speculative result data value.

39. A computer system, comprising:

memory subsystem coupled for communication over a host bus, the memory subsystem storing an instruction comprising at least one logical register source;

processor coupled to the host bus, the processor fetching the instruction from the memory subsystem, the processor generating a physical register source by renaming the logical register source, such that the physical register source specifies a physical register or a committed state register, the processor reading a speculative result data value and a speculative source valid flag from the physical register if the physical register source specifies the physical register, the processor reading a committed result data value from the committed state register if physical register source specifies the committed state register, the processor combining the speculative result data value the speculative source valid flag with the committed result data value and a committed source valid flag, the processor scheduling execution of the instruction according to the combined speculative and committed source valid flags.

40. The computer system of claim 39, wherein the processor comprises:

register rename circuit receiving the instruction and generating the physical register source by renaming the logical register source, such that the physical register source specifies a physical register or a committed state register;

reorder buffer containing the physical register, the reorder buffer receiving the physical register source from the register rename circuit and reading the speculative result data value and the speculative source valid flag from the physical register and transferring and transferring the speculative result data value and the speculative source valid flag over a speculative source data bus if the physical register source specifies the physical register, the speculative source valid flag indicating whether the speculative source data value is valid;

real register file containing the committed state register, receiving the physical register source from the register rename circuit and reading the committed result data value from the committed state register and transferring the committed result data value over a committed source data bus if physical register source specifies the committed state register;

first multiplexer coupled to the speculative source data bus and the committed source data bus, the first multiplexer transferring the speculative result data value the speculative source valid flag over a source data bus as a source data value and a valid flag if the physical register source specifies the physical register, the first multiplexer transferring the committed result data value and a committed source valid flag indicating that the committed result data value is valid over the source data bus as the source data value and the valid flag if the physical register source specifies the committed state register;

dispatch circuit receiving the source data value and the valid flag over the source data bus, the dispatch circuit storing the source data value and the valid flag and scheduling execution of the instruction according to the valid flag.

41. The computer system of claim 40, wherein the instruction further comprises at least one immediate valid flag, the immediate valid flag indicating whether the instruction includes an immediate operand.

42. The computer system of claim 41, wherein the processor further comprises a second multiplexer coupled to receive the source data value and the valid flag over the source data bus and coupled to receive the immediate operand, the second multiplexer transferring the immediate operand and an immediate operand valid flag indicating that the immediate operand is valid over the source data bus as the source data value and the valid flag if the immediate valid flag specifies the immediate operand.

43. The computer system of claim 40, wherein the physical register source comprises a register pointer and a real register valid flag, the real register valid flag indicating whether the register pointer specifies the physical register or the committed state register.

44. The computer system of claim 40, wherein the speculative source valid flag indicates whether the speculative source data value is a speculative result data value has been produced by completed execution of another instruction.

* * * * *

UNITED STATES PATENT AND TRADEMARK OFFICE
CERTIFICATE OF CORRECTION

PATENT NO. : 5,452,426
DATED : September 29, 1995
INVENTOR(S) : Papworth et al.

It is certified that error appears in the above-identified patent and that said Letters Patent is hereby corrected as shown below:

In column 5 at line 30 delete "151" and insert --51--

In column 5 at line 68 delete "thd" and insert --the--

Signed and Sealed this

Fifteenth Day of October, 1996

*Attest:*

BRUCE LEHMAN

*Attesting Officer*  *Commissioner of Patents and Trademarks*